United States Patent [19]
Koenig et al.

[11] Patent Number: 4,722,981
[45] Date of Patent: Feb. 2, 1988

[54] EPOXY RESINS OF CONTROLLED CONVERSION AND A PROCESS FOR THEIR PREPARATION

[75] Inventors: Raymond A. Koenig, Vendenheim, France; Brian W. Elliott, Alconbury, Great Britain

[73] Assignee: The Dow Chemical Company, Midland, Mich.

[21] Appl. No.: 10,057

[22] Filed: Jan. 29, 1987

Related U.S. Application Data

[63] Continuation-in-part of Ser. No. 765,998, Aug. 15, 1985, abandoned.

[30] Foreign Application Priority Data

Feb. 14, 1986 [GB] United Kingdom ................ 8603701

[51] Int. Cl.$^4$ .................... C08G 59/06; C08G 59/08
[52] U.S. Cl. .................................... 525/481; 525/507; 528/87; 528/99; 528/104
[58] Field of Search ............... 528/89, 87, 104, 99; 525/481, 507

[56] References Cited

U.S. PATENT DOCUMENTS

| | | | |
|---|---|---|---|
| 2,506,486 | 5/1950 | Bender et al. | 260/47 |
| 2,615,008 | 10/1952 | Greenlee et al. | 260/47 |
| 3,632,836 | 1/1972 | Walker | 260/830 |
| 4,568,735 | 2/1986 | Li | 528/89 |

*Primary Examiner*—Earl Nielsen

[57] ABSTRACT

Epoxy resins containing both terminal hydroxyl groups and epoxy or epoxy-derived groups are prepared by advancing a polyepoxide with a polyol and terminating the reaction at a point such that the epoxy resin reaction product contains both epoxy and terminal hydroxyl groups. The controlled conversion resins have improved cure rates. The epoxy groups can be further reacted to form epoxy-derived groups to improve the cure rate even further. The epoxy resins exhibit lower melt and solution viscosities than those exhibited by conventional epoxy resins having the same epoxy equivalent weight, as well as curing quickly when used. The resins are usefully employed at high solids levels in can coating formulations and other epoxy formulations wherein the resin is applied from an organic liquid solution or aqueous dispersion.

24 Claims, No Drawings

EPOXY RESINS OF CONTROLLED CONVERSION AND A PROCESS FOR THEIR PREPARATION

CROSS-REFERENCE TO RELATED APPLICATION

This is a continuation-in-part to copending U.S. patent application Ser. No. 765,998, filed Aug. 15, 1985, now abandoned.

BACKGROUND OF THE INVENTION

The present invention relates to epoxy resins; to a process for preparing said resins and to compositions containing these resins.

Due to their physical and chemical properties such as resistance to chemical attack, good adhesion to various substrates, solvent resistance and hardness, epoxy resins are useful in a wide variety of commercial applications including the coating of various substrates such as metal, wood and plastic, and the preparation of structural and electrical laminates. In many applications such as the coating of the interior of containers ("cans"), the epoxy resin is applied from an organic liquid solution or aqueous dispersions.

Epoxy resins of differing molecular weight (so-called "advanced epoxy resins") can be prepared by the reaction of a polyepoxide such as the diglycidyl ether of bisphenol A with a polyhydric phenol such as bisphenol A.

The molecular weight of the epoxy resin generally affects the softening point, melt viscosity and solution viscosity of the epoxy resin as well as the physical and chemical properties of the cured product prepared therefrom. It is often desirable to prepare as high a molecular weight epoxy resin as practical to provide a product of sufficient toughness. High molecular weight resins are generally prepared by a two-step process wherein a lower molecular weight epoxy resin is prepared initially by reacting a polyhydric phenol with epichlorohydrin and alkali metal hydroxide in the presence of a catalyst. Thereafter, the initial polyepoxide reaction product is advanced by its reaction with additional amounts of polyhydric phenol to form the higher molecular weight material. In conventional techniques for preparing the epoxy resins, the reaction of the polyepoxide and polyhydric phenol is typically carried to complete conversion such that the final, advanced epoxy resin contains relatively low amounts of residual phenolic hydroxyl groups. For example, epoxy resins having an EEW (epoxy equivalent weight) between about 500 and about 700 prepared from bisphenol A and the diglycidyl ether of bisphenol A typically contain less than about 800 parts per million of phenolic hydroxyl groups which represents more than about 98 percent conversion of the phenolic hydroxyl groups employed in preparing the epoxy resin. A higher molecular weight epoxy resin having an EEW from greater than about 2000 to about 4000 typically contains less than about 2500 ppm of phenolic OH groups which represents more than about 95 percent conversion of the phenolic hydroxyl groups. Any residual hydroxyl groups in the advanced resin have been stated to cause viscosity instability of the resulting resin mixture, particularly at elevated temperatures. As a means for controlling the stability of the resin due to the unreacted phenolic hydroxyl groups, U.S. Pat. No. 3,842,037 suggests adding a strong, inorganic acid when at least about 85, more preferably at least about 95, percent of the phenolic hydroxyl groups employed in the advancement reaction have been reacted.

Alternatively, in another method for preparing a high molecular weight epoxy resin, U.S. Pat. No. 3,352,825 teaches condensing a dihydric phenol with an excess of epichlorohydrin in the presence of a catalyst such as an alkali metal or ammonium salt of an inorganic monobasic acid to form an intermediate having a free hydroxyl content in the range of from about 0.2 to about 0.95 phenolic hydroxyl group per mole of said dihydric phenol. Subsequently, the excess epichlorohydrin is removed and the intermediate condensate subsequently dehydrochlorinated, using caustic alkali and simultaneously the free phenolic hydroxyl groups are reacted with the epoxy groups formed in situ to form a product free of hydroxy groups.

Unfortunately, increasing the molecular weight of an epoxy resin also generally increases the melt and solution viscosities of the resin. Such increase in melt and solution viscosities renders the application of the epoxy resin more difficult.

One method by which the melt and solution viscosities of an epoxy resin can be reduced for a given EEW is by regulating the chain growth using a monofunctional reactant such as a monofunctional phenolic or epoxy compound as a capping agent. Unfortunately, the use of these capping agents results in a formation of an epoxy resin having reduced epoxy functionality and a lower softening point at a given EEW. The reduction in epoxy functionality markedly reduced the physical properties such as toughness of the cured resin product prepared therefrom.

In view of the aforementioned characteristics of the epoxy resins known in the prior art, it would be highly desirable to provide an epoxy resin having a lower melt and/or solution viscosity without a coincident and significant decrease in the softening point of the resin or in the physical properties of the resulting products prepared from the resin.

SUMMARY OF THE INVENTION

Accordingly, in one aspect, the present invention is an epoxy resin comprising the reaction product of a polyepoxide and a polyol wherein the reaction product contains both epoxy groups and terminal hydroxyl groups in an amount of at least about 0.25 weight percent of each of the epoxy groups and the terminal hydroxyl groups, said weight percent being based on the total weight of the epoxy resin reaction product.

The epoxy resins of the present invention, which are hereinafter referred to as Controlled Conversion Resins (CCR resins), offer a significant number of advantages over conventional epoxy resins which are fully converted and contain essentially no terminal hydroxyl groups. For example, the melt and solution viscosity of the CCR resins are reduced when compared to conventional epoxy resins having the same EEW. Moreover, the epoxy resins of the present invention are capable of being cured to chemically resistant products having physical properties which are essentially equivalent to conventional resins.

Due to the fact that CCR resins contain both epoxy and terminal hydroxyl groups, the CCR resins can constitute a convenient homogeneous, one-component system which need not require an additional hardener. For example, solid CCR resins can be formulated into a powder coating by the addition of an accelerator only.

In general, these powder coating formulations exhibit increased stability against sintering as compared to a conventional epoxy resin formulation due to their higher softening point at a given melt viscosity.

Due to the lower solution viscosity of the CCR resins, the resins are capable of being formulated in an organic liquid at a higher solids level than conventional epoxy resins having the same EEW to prepare solutions having equivalent viscosities. Such high solid epoxy resin formulations can be conveniently applied to a substrate to form a coating of equivalent flexibility and chemical resistance as a coating prepared from a conventional epoxy resin applied from a solution of lower solids content.

In another aspect, the present invention is a process for preparing an epoxy resin which method comprises reacting a polyepoxide with a polyol in the presence of a catalyst for the reaction of an epoxy group with a hydroxyl group and terminating the reaction at a point at when the reaction product contains at least about 0.25 weight percent of each of the epoxy groups and the terminal hydroxyl groups, said weight percent being based on the total weight of the epoxy resin reaction product.

It has been further found that the CCR resins of the present invention, while suitable for producing very desirable resin products and coatings could have their curing times improved even more while maintaining the excellent product properties when the epoxy groups were further reacted.

Accordingly, another aspect of the present invention is an epoxy resin comprising the reaction product of a polyepoxide and a polyol wherein the reaction product contains both (a) terminal phenolic hydroxyl groups in an amount of at least about 0.15 equivalents per kilogram resin (eq/kg) and (b) groups derived from epoxy groups and optionally epoxy groups in a total amount which is greater than about 0.05 equivalents per kilogram resin. The method for the calculation of eq/kg as used herein is described below in connection with Table IV.

In still another aspect, the present invention is a process for preparing an epoxy resin which method comprises reacting a polyepoxide with a polyol in the presence of a catalyst for the reaction of an epoxy group with a hydroxyl group and terminating the reaction at a point when the reaction product contains at least about 0.05 equivalents epoxy groups per kilogram resin and about 0.15 equivalents terminal phenolic hydroxyl groups per kilogram resin, then reacting at least a portion of the epoxy groups to form epoxy-derived groups. These further reacted epoxy resins of the present invention are found to surprisingly possess all the advantageous properties of controlled conversion resins with the additional, unexpected benefit of improved curing times combined with excellent stability. It is especially preferred to convert at least a portion of the epoxy groups on these CCR resins, to phosphate ester groups and alpha glycols.

DETAILED DESCRIPTION OF THE INVENTION

The polyol component advantageously employed in preparing the CCR resin is a polyhydric alcohol containing an average of more than about one hydroxyl group, preferably about 1.8 or more hydroxyl groups, reactive with the epoxy groups of the polyepoxide. The polyols can be saturated or unsaturated aliphatic, cycloaliphatic, aromatic or heterocyclic compounds which can be substituted with one or more non-interfering substituents such as halogen atoms or ether radicals. In general, the preferred polyols are polyhydric phenols. The polyhydric phenols advantageously employed in preparing the epoxy resins are polyhydric phenols represented by the following structural formula:

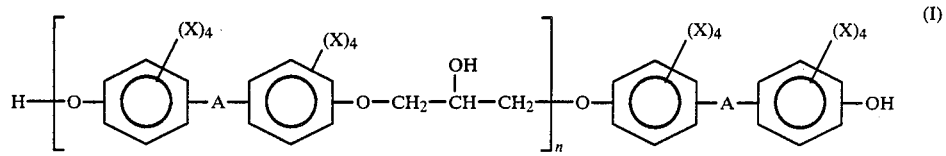

wherein each A is independently —O—S; —S—, —S—S—, —C(O)—, —S(O)—, —S(O)$_2$—, a divalent hydrocarbon radical containing from about 1 to about 8 carbon atoms or a divalent oxygen, sulfur, or nitrogen containing hydrocarbon radical or a covalent bond; each X is independently hydrogen, halogen or an alkyl group containing from about 1 to about 4 carbon atoms and n has an average value of from 0 to about 5, preferably from 0 to about 2: and the novolac resins (phenol-aldehyde) condensates of the formula:

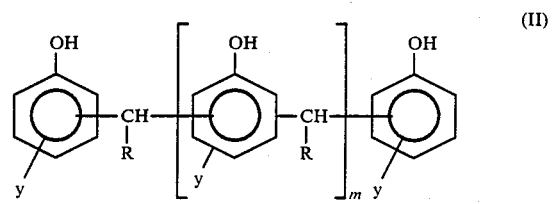

wherein each R is individually hydrogen or an alkyl radical having from about 1 to about 4 carbon atoms, each Y is independently hydrogen, chlorine, bromine or a lower alkyl group and m has an average value from 0 to about 10. Mixtures of one or more polyhydric phenols are also suitably employed herein.

Preferably, the polyhydric phenol is a polyhydric phenolic compound of the general structural formula (I) wherein A is a divalent hydrocarbon radical having from about 1 to about 8 carbon atoms, each X is hydrogen, and n has an average value of from 0 to about 0.5, more preferably 0. Most preferred of the polyhydric phenols is 2,2-bis(-4-hydroxy phenyl) propane, commonly referred to as bisphenol A (BPA).

The polyepoxide component useful in preparing the epoxy resin of the present invention is a compound having two or more epoxide groups. The polyepoxides can be saturated or unsaturated aliphatic, cycloaliphatic, aromatic or heterocyclic compounds and can be substituted with one or more non-interfering substituents such as halogen atoms or ether radicals which are not reactive with the epoxy or hydroxyl groups at the conditions at which the CCR resins are prepared. The polyepoxide component which is reacted with the polyol to form the CCR resin can be monomeric or polymeric.

Illustrative examples of epoxy resins useful herein are described in *The Handbook of Epoxy Resins* by H. Lee and K. Neville, published in 1967 by McGraw-Hill, New York, in appendix 4-1, ppgs. 4-35 through 4-56, which is incorporated herein by reference.

Polyepoxides of particular interest in the practice of this embodiment include the polyglycidyl ethers of bisphenol compounds represented by the general structural formula:

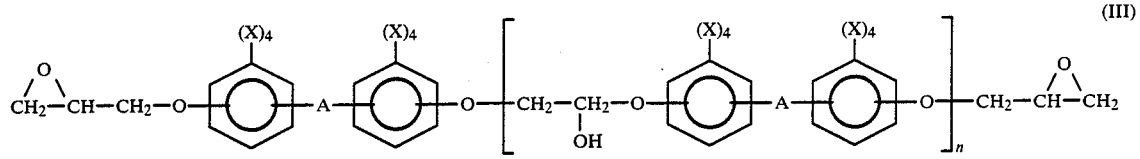

wherein each A and X are as described above in the description of formula (I) and n has an average value of 0 to about 4, preferably 0 to about 2, most preferably from 0 to about 0.5; the polyglycidyl ethers of a novolac resin, i.e., phenol aldehyde condensates of the formula:

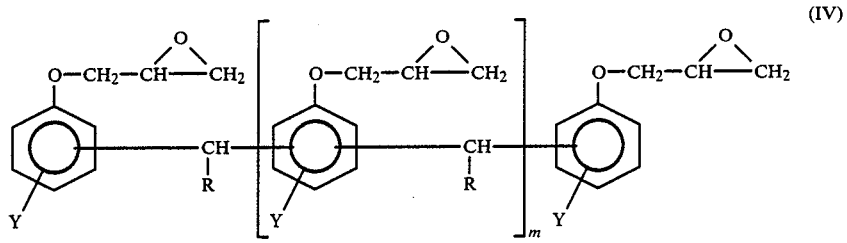

wherein R, Y and m are described as above with reference to formula (II); polyglycidyl ethers of polyglycols such as the diglycidyl ether of polypropylene glycol; and the polyglycidyl ethers of tris(phenol)methane. Mixtures of one or more polyepoxides are also suitably employed herein. Preferred polyepoxides are the liquid polyglycidyl polyethers of a bisphenol, particularly the diglycidylether of bisphenol A; the polyglycidyl polyethers of a tetrabromobisphenol, particularly the diglycidylether of tetrabromobisphenol A and mixtures thereof.

The polyepoxide and polyol are advantageously employed in an amount such that the number of epoxy equivalents in the polyepoxide to the number of hydroxyl equivalents of the polyol is from about 0 1:1 to about 10:1. Preferably, the polyepoxide and polyol components are employed in a ratio from about 0.3:1 to about 5:1, more preferably from about 0.3:1 to about 2 1, epoxy equivalents to hydroxyl equivalents. The relative proportions of the polyepoxide and polyol components most advantageously employed will be dependent on a variety of factors including the specific polyepoxide and polyol employed and the desired properties of the epoxy resin prepared therefrom. In a preferred CCR resin, the polyepoxide component is employed in less than a stoiohiometric amount. In a most preferred embodiment, from about 0.6:1 to about 1.6:1 hydroxyl equivalents are employed for each epoxy equivalent of the polyepoxide.

In preparing the CCR resins, the polyol and the polyepoxide components are contacted in the presence of a catalyst for the reaction between the hydroxyl groups of the polyol and the epoxy groups of the polyepoxide and at conditions sufficient to form the desired CCR resin. Preferably, this reaction is conducted neat, i.e., in the absence of any reaction diluent.

Materials capable of catalyzing the stated reaction are well-known in the art and reference is made thereto for the purposes of this invention. Illustrative catalysts are set forth in U.S. Pat. Nos. 2,216,099; 2,633,458; 2,658,855; 3,377,406; 3,694,407; 3,948,855; 4,389,520; 4,354,015; and 3,477,990 and *The Handbook of Epoxy Resins* by H. Lee and K. Neville, published in 1967 by McGraw-Hill, New York, all of which are incorporated herein by reference. Representative of the described catalysts are secondary and tertiary amines, preferably tertiary amines such as benzyl dimethyl amine, triethyl amine and benzyl diethyl amine; the alkali metal hydroxides e.g., potassium hydroxide; quaternary ammonium compounds such as tetralkylammonium halides, e.g., tetramethyl ammonium chloride and phosphines and quaternary phosphonium salts such as triphenyl phosphine and ethyltriphenyl phosphonium acetate-acetic acid complex.

The catalyst is typically employed in conventional amounts. These amounts will vary depending on the specific catalyst, polyepoxide and polyol employed but will preferably vary from about 0.005 to about 1 weight percent based on the total weight of the polyol and polyglycidyl ether components. More preferably, from about 0.01 to about 0.5 weight percent of the catalyst is employed, said weight percent being based on the total weight of the polyol and polyepoxide components.

Although not preferred, the reaction of the polyol and polyepoxide components can be conducted in the presence of a reaction diluent. If employed, the reaction diluent is preferably a solvent for or miscible with both the polyol and polyepoxide component. Representative solvents which can be employed include various glycol ethers such as ethylene or propylene glycol monomethylether and esters thereof such as ethylene glycol monoethylether acetate; ketones such as methylisobutylketone, methylethylketone and acetone; and aromatic hydrocarbons such as toluene, xylene or mixtures thereof. If employed, the organic liquid reaction diluent is generally employed in an amount from about 5 to about 300 percent based on the total weight of the polyol and polyepoxide components.

The reaction of the polyol and polyepoxide is advantageously carried out at an elevated temperature, preferably from about 60° C. to about 200° C., more preferably from about 100° C. to about 180° C. The reaction is continued until the desired conversion, as determined by measuring the residual epoxy and terminal hydroxyl content in the resin, at which point, the reaction is effectively terminated.

Any method which effectively inhibits the reaction upon reaching the desired degree of conversion can be employed herein. The reaction is effectively inhibited when the rate of reaction of the hydroxyl and epoxy group is sufficiently reduced such that further reaction, if any, does not significantly and deleteriously affect the product or its handling characteristics. Preferably, the reaction is sufficiently inhibited such that the solution viscosity of the CCR resin remains essentially constant or increases only marginally with time. For example, upon reaching the desired degree of conversion the reaction mixture can be quenched to stop the reaction. However, the rapid quenching of the reaction mixture must be conducted carefully to prevent clotting or lumping of the CCR resin and to prevent the CCR resin from forming a large solid mass which cannot subsequently be used.

A convenient method for cooling the reaction mixture comprises the addition of a solvent to the mixture, thereby diluting the mixture and reducing its temperature. The amount of organic solvent to be added is dependent on the reaction temperature and the temperature at which reaction is effectively terminated. The addition of organic solvent to the reaction mixture is particularly preferred when the CCR resin is subsequently to be applied from solution.

A most preferred method for inhibiting the reaction comprises adding a material to the reaction mixture which effectively inhibits further reaction such as by deactivating the catalyst, or by interrupting the reaction mechanism, thereby inhibiting further reactions between the polyol and the polyepoxide.

Strong inorganic and organic acids and the anhydrides and esters of said acids (including half esters and part esters) have been found to be particularly effective as reaction inhibitors. By the term "strong acid" it is meant an organic acid having a pK$_a$ value below about 4, preferably below about 2.5. Representative reaction inhibitors include inorganic acids such as hydrochloric acid, sulfuric acid and phosphoric acid; inorganic acid anhydrides such as phosphoric acid anhydride (P$_2$O$_5$); esters of inorganic acids such as dimethyl sulfate; the organic acids such as alkyl, aryl and aralkyl and substituted alkyl, aryl and aralkyl sulfonic aicds such as p-toluene sulfonic acid and phenyl sulfonic acid and stronger organic carboxylic acids such as triohloroacetic acid and alkyl esters of said acids, such as the alkyl esters of p-toluene sulfonic acid, e.g., methyl-p-toluene sulfonate, and ethyl-p-toluenesulfonate and methanesulfonic acid methylester. An example of an acid anhydride of a strong organic acid that can be employed herein is p-toluene sulfonic acid anhydride. Of the reaction inhibitors, the alkyl esters of sulfuric acid: the aryl or aralkyl sulfonic acids and the alkyl esters of said acids are preferably employed herein. Most preferably, an alkyl ester of para-toluene sulfonio acid, particularly methyl or ethyl-p-toluene sulfonic acid is employed as the reaction inhibitor herein.

The amounts of reaction inhibitor added to the reaction mixture are dependent on the specific inhibitor employed and the catalyst employed in preparing the CCR resin. In general, the inhibitor is added in an amount sufficient to overcome the catalytic activity of the catalyst. Preferably, at least about 0.9, more preferably at least about 2, equivalents of the inhibitor are added for each equivalent of the catalyst employed. Although the maximum amount of inhibitor added to the reaction mixture is dependent on the desired properties of the resin and the expense of adding excess inhibitor, the inhibitor is preferably added in an amount not exceeding about 5 equivalents for each equivalent of catalyst in the reaction mixture.

The reaction is terminated at a point such that the resulting CCR resin contains the desired amounts of epoxy groups and terminal hydroxyl groups. In this invention, the CCR resin will contain at least about 0.25 percent, by weight, of each of the epoxy and terminal hydroxyl groups. By the term "epoxy group" it is meant a radical of the following structural formula:

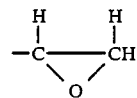

having an equivalent weight of 43 and by the term "terminal hydroxyl group" it is meant a terminal hydroxyl group having an equivalent weight of 17. For the purposes of this invention, the percent epoxy groups in the CCR resin reaction product is determined by the method described in Footnote (1) of Table I. The percent terminal phenolic hydroxyl groups is determined by the method described in Footnote 2 of Table I.

These weight percentages can also be viewed as the numbers of equivalents of the epoxy and hydroxyl groups per kilogram of the resin reaction product. It has been determined that 0.25 weight percent of the epoxy group is aobut 0.05 epoxy equivalents per kilogram resin produced. Similarly, 0.25 weight percent of the hydroxyl group is about 0.15 hydroxyl equivalents per kilogram resin produced.

The hydrolyzable chloride content of the CCR resin is generally less than about 1 and often less than about 0.5 percent based on the total weight of the epoxy resin reaction product. However, a hydrolyzable chloride content of up to about 5, preferably up to about 2, weight percent based on the total weight of the epoxy resin reaction product can be tolerated. The amounts of hydrolyzable chloride are determined for the purpose of this invention by the method described in *The Handbook of Epoxy Resins* by H. Lee and K. Neville (supra) pages 4–29 and 4–30 (Table 4–23).

Although the amount of epoxy groups and terminal hydroxyl groups most advantageously contained by the CCR resin is dependent on the desired properties of the CCR resin, e.g., its solution viscosity, the CCR resin preferably contains at least about 0.5, more preferably at least about 1, percent of epoxy groups and at least about 0.25, more preferably at least about 0.5, percent of terminal hydroxyl groups, said weight percents being based on the total weight of the CCR resin. In general, the CCR resin preferably comprises less than about 20, more preferably less than about 12, weight percent of epoxy groups and less than about 10, more preferably less than about 5 weight percent of the terminal hydroxyl groups.

Conversion of the polyol and polyepoxide components is controlled such that the CCR resin contains the desired amounts of epoxy and hydroxyl groups. This conversion is dependent on the amount of polyol and epoxide employed. Advantageously, at least about 10 percent and up to about 95 percent of the monomer type which is present in the lower amount (the deficient component) or, if the monomer types (components) are employed in equivalent amounts, of both components are reacted. Preferably, at least about 35, more preferably at least about 45, most preferably at least about 55, and up to about 95, more preferably up to about 90, most preferably up to about 85, percent of the deficient component are reacted.

The molecular weight (number average) of the CCR resin is dependent on the desired end-use application of the CCR resin and the physical and chemical properties required for said end use. Preferably, the CCR resins have a molecular weight of less than about 10,000. More preferably, the CCR resins will possess molecular weights of less than about 4000, most preferably less than about 2000, and more preferably more than about 300, most preferably more than about 500.

In the practice of the present invention, the polyepoxide can be advanced with a polyol and, optionally, a polyacid to completion (thereby forming a resin having either only epoxy groups or terminal hydroxyl groups depending on which reactant is employed in excess) in one reaction step and thereafter reacted with a polyol or a polyepoxide component to form the CCR resin. However, more preferably, the polyepoxide such as the diglycidyl ether of bisphenol A is reacted, in a one-step reaction, with the polyol to form the desired CCR resin.

Upon termination of the reaction, the CCR resin can be formulated into a number of different compositions for use in a variety of end-use applications. For example, the CCR resin can be admixed with an accelerator and, optionally, other adjuncts such as flow control agent to form a powder coating composition. Although no additional hardener is required since the CCR resin contains both unreacted epoxy and unreacted terminal hydroxyl groups, a hardener is often advantageously added to the powder coating.

Hardeners and accelerators conventionally employed in powder coating compositions can be employed in a powder coating composition of the CCR resin. Such hardeners and accelerators are well-known in the art and reference is made thereto for the purposes of this invention. Representative accelerators include stannous salts of monocarboxylic acids, such as stannous octoate and stannous laurate, various alkali metal salts such as lithium benzoate, certain heterocyclic compounds such as imidazole and benzimidazole compounds and salts thereof, onium compounds such as quaternary ammonium and phosphonium compounds and tertiary amines and phosphines.

Preferred accelerators for use in preparing the powder coating formulations are those which are solid at room termperature and include the imidazoles, particularly the alkyl substituted imidazoles such as 2-methyl imidazole, solid phosphines or amines such as triphenyl phosphine and phosphonium and quaternary ammonium compounds. Most preferred are the imidazoles.

In preparing the powder coating composition, the amount of accelerator most advantageously employed will vary depending on the particular accelerator and the CCR employed. Preferably, the accelerator will be employed in an amount from about 0.01 to about 5 weight percent based on the weight of the CCR resin. More preferably, the accelerator is employed in an amount from about 0.02 to about 3 weight percent based on the weight of the CCR resin.

Representative of the optionally employed hardeners are phenolic hardeners such as phenolic or cresol novolacs and the phenolic hardeners as described in British Patent Specification No. 1,429,076, dicyandiamide, acid anhydrides such as trimelletic anhydride and the acid functional polyesters. If employed, the hardeners are generally employed in an amount from about 1 to about 50 weight percent based on a total weight of the CCR resin.

When the controlled conversion resins are further reacted, the final resin produced according to the invention has a total of at least 0.15 equivalents of terminal phenolic hydroxyl groups per kilogram resin and at least 0.05 equivalents of epoxy groups and epoxy-derived groups per kilogram resin, (eq/kg) with at least a portion being the epoxy-derived groups. Of course, a corresponding number of equivalents of the hydroxyl and epoxy groups are necessary in the controlled conversion resin from which the present resins are prepared. It has been found that the number of epoxy groups in the controlled conversion resins suitable for use according to the present invention is preferably from about 0.058 to about 2 equivalents per kilogram resin and more preferably from about 0.1 to about 1 equivalent, prior to conversin to the epoxy-derived group, while the preferred number of terminal phenolic hydroxyl equivalents is from about 0.15 to about 5.88, more preferably from about 1 to about 3, per kilogram resin. Most preferably, the resins contain from about 0.2 to about 0.8 eq/kg of epoxy groups prior to conversion of any of the epoxy groups to epoxy-derived groups and about 1.5 to about 2.5 eq/kg terminal phenolic hydroxyl groups.

It was found not only that the above ranges of hydroxyl group and epoxy group concentrations were necessary in the controlled conversion resins to produce epoxy resins especially good for solution coating formulations, but surprisingly that the conversion of at least a portion of the epoxy groups into epoxy-derived groups further improved the curing rate of these resin formulations. Preferably, the number of terminal phenolic hydroxyl groups is not substantially changed. It was found that when the epoxy groups of these controlled conversion resins were further reacted to form epoxy-derived groups such as $\alpha$-glycol or phosphate ester groups, curing times are substantially reduced while good resin and coating properties are maintained.

In general, the epoxy groups of the controlled conversion resin can be converted to any sort of epoxy-derived functional group that will not detrimentally affect the curing reaction. Although the present invention is in no way limited by such theroy, it is believed that a hydrolysis reaction of the epoxy group with added water forms $\alpha$-glycols and is a way to conveniently convert the epoxy groups to suitable epoxy-derived groups. In this regard, the number of equivalents of epoxy groups will determine the amount of water or other reactant necessary to form the $\alpha$-glycol and possibly other types of epoxy-derived groups. In general, water is used in excess amounts of from about 0.5 to about 20 weight percent based on the total resin weight, preferably about 1 to about 10 weight percent.

Reaction of the controlled conversion resins with water and acid can also be employed to convert the epoxy groups. It is theorized that this is a conversion of the epoxy groups to α-glycols and acid esters and possibly other types of groups derived from the epoxy groups but the present invention is not to be limited by this theory. Water and acid are used generally in amounts of about 0.3 to about 10 weight percent water and about 0.1 to about 5 weight percent acid, these weight percentages based on the total weight of the resin to which the water and acid are added. More preferably, the respective weight percentages of water and acid are about 0.5 to about 3 weight percent and about 0.2 to about 2 weight percent.

In a preferred method of practicing the present invention, the epoxy groups of the controlled conversion resin are reacted with water and a phosphorous-containing acid. Although not limiting the invention, the theory is that there is conversion of the epoxy groups into a mixture of epoxy-derived groups comprising at least α-glycol groups and phosphorous-containing acid ester groups and possibly other groups. In this embodiment, the amounts of water and phosphorous-containing acid (preferably phosphoric acid) are balanced to maximize the mono-esters and minimize the tri-esters. It has been found generally that when the phosphorous-containing acid is used in this way with a controlled conversion resin it should be added in amounts of from about 0.1 to about 3 weight percent based on the resin weight, preferably from about 0.2 to about 1.5 weight percent while the water used in conjunction should be added in amounts of from about 0.2 to about 10 weight percent based on the resin weight, preferably from about 0.5 to about 3 weight percent.

In another preferred embodiment of the present invention, in one step amounts of water and acid, and preferably a phosphorous-containing acid, are employed as a reaction inhibitor in preparing the controlled conversion resins, in excess of amounts taught to inhibit the polyol polyepoxide reaction, which excess amount is then able to react with the epoxy groups of the controlled conversion resin to form the epoxy-derived groups, most preferably, the above-described mixture of such groups comprising α-glycols and phosphorous-containing acid esters. When used in this fashion to both inhibit the reaction and convert the epoxy groups to epoxy-derived groups, the acid is used in amounts of from about 0.1 to about 3 weight percent based on the weight of resin, preferably from about 0.2 to about 1.5 weight percent.

It has been found that at least about 30 percent of the epoxy groups of a controlled conversion resin need to be converted to epoxy-derived groups in order to improve the curing rate, preferably more than about 50 percent and most preferably substantially all the epoxy groups are converted. Although containing substantially no epoxy groups, such resins are referred to herein as epoxy resins in view of their origin. Of course when the reaction is inhibited and the epoxy groups are converted in a single step and/or by a single reactant such as phosphoric acid, there is not necessarily isolated a controlled conversion resin having a specific epoxy group content. In these types of situations, within the scope of the present invention, the reduced number epoxy groups remaining in the final resin product (if any) and the presence of the epoxy-derived groups will be indicative of the practice of the present invention and will produce the improved resins thereof.

Following preparation of the CCR resin or the further reacted product, it can be dissolved in an organic liquid for subsequent application. Suitable organic liquids for preparing the organic liquid solution of the resin are dependent on the particular resin and the amounts of terminal hydroxyl and epoxy groups in the resin. In general, alcohols such as n-butanol, glycol ethers suoh as propylene glycol monomethyl ether and esters thereof, ketones, aliphatic or aromatic hydrocarbons such as xylene and chlorinated aliphatic and aromatic hydrocarbons are preferred.

In preparing an organic liquid solution of the CCR resin or the further reacted product, it is generally desirable to employ a hardener which is also soluble in the organic liquid. Such hardeners are well-known in the art and reference is made thereto for the purposes of this invention. Representative hardeners include phenolic resole resins such as the reaction product of phenol with an excess of formaldehyde and other hydroxymethyl-containing benzene derivatives and alkylated derivatives thereof and amine-aldehyde condensates, commonly referred to as "aminoplast" or "aminoplastics" which are the condensation products of an aldehyde with an amine such as melamine, urea and benzoquanamine and the alkylated derivatives thereof.

The amount of the hardener most advantageously employed is dependent on a variety of factors including the end-use application for the organic liquid solution and the desired physical and chemical properties of said end-use application. Preferably, from about 1 to about 50 weight percent of the hardener are employed based on the total weight of the CCR resin or further reacted product and hardener.

In addition, it is often desirable to add a small amount of an inorganic acid to the organic liquid solution as a catalyst for the reaction of the CCR or further reacted resin with the hardener. In general, the inorganic acid is preferably phosphoric acid and is used in an amount from about 0.1 to about 5 weight percent based on the total weight of the organic liquid solution. In particular, if the epoxy groups of the CCR have been reacted to form phosphate esters, this hardening catalyst may not be needed.

The solids concentration at which the organic liquid solution is prepared is dependent on various factors including the desired viscosity of the resulting solution. In general, the organic liquid solution is formulated such that the solids content is as high as possible while maintaining a sufficiently low viscosity for effective application. Since the resins of the present invention exhibit a lower solution viscosity than conventional resins which would possess equivalent cured properties, the organic liquid solution of the present resins can generally be prepared at higher solids concentrations than an organic liquid solution of a conventional resin. For example, a CCR resin useful in coating applications is advantageously formulated as an organic liquid solution which comprises at least about 40 percent of the CCR resin and any hardener employed based on the total weight of the organic liquid solution. More preferably, the liquid solution contains at least 50 percent, most preferably from about 50 to about 70 weight percent of the CCR resin and hardener.

The following examples are set forth to illustrate the invention and should not be construed to limit its scope. In the examples, all parts and percentages are by weight unless otherwise specified. In Examples 1-20 and Comparative Examples A-E, the polyglycidyl ethers, polyols, catalysts and reaction inhibitors are designated as follows:

| Component | Designation | Descriptions |
|---|---|---|
| Polyepoxide | A | Diglycidyl ether of bisphenol A having an EEW of 180 |
|  | B | Epoxy novolac resin having a functionality of 3.6 and an EEW of 179.4 |
|  | C | An aliphatic diglycidyl ether of polyglycol having an EEW of 324.2 |
| Polyol | D | Bisphenol A |
|  | E | Hydroquinone |
|  | F | Ethylene glycol |
| Catalyst | G | Ethyltriphenyl phosphonium acetate monoacetic acid complex (70 weight percent solution in methanol) |
|  | H | N—Ethyl morpholine |
|  | I | N—Methyl morpholine |
|  | J | Potassium hydroxide |
|  | K | Dimethylethanolamine |
| Reaction Inhibitor | L | Methyl ester of paratoluene sulfonic acid |
|  | M | Paratoluene sulfonic acid |
|  | N | Dimethylsulfate |

EXAMPLE 1

Into a suitably sized reaction vessel equipped with a heating mantle and a nitrogen sparger was added 589.6 grams (g) (3.28 equivalents) of Polyepoxide A and 210.4 g (1.85 equivalents) of Polyol D (the ratio of epoxy equivalents to hydroxyl equivalents being 1.77:1). The components were mixed together and heated to 90° C. to dissolve the polyol in the polyepoxide. Then 0.2 g of Catalyst G were added to the reaction mixture. The reaction mixture containing the catalyst was stirred and maintained at 120° C. for 2½ hours and then at 125° C. for 2½ hours. At this time, the resin contained a significant number of terminal hydroxyl groups. The reaction was then stopped by pouring the reaction product on the aluminum foil where it was immediately cooled and solidified.

EXAMPLE 2

CCR resin was prepared using the same techniques as employed in Example 1 except that 582.4 g (3.24 equivalents) of Polyepoxide A and 217.6 g (1.91 equivalents) of Polyol D (epoxy:hydroxyl equivalents = 1.69:1) were employed.

EXAMPLE 3

A CCR resin was prepared using the techniques of Example 1, except that 716.8 g (3.98 equivalents) of Polyepoxide A, 283.2 g (2.48 equivalents) of Polyol D (epoxy:hydroxyl = 1.61:1) and 0.35 g of Catalyst G were employed. The reaction mixture was stirred and maintained at 135° C. for 1½ hours before the reaction was stopped by the method described in Example 1.

EXAMPLE 4

A CCR resin was prepared using the techniques of Example 1 except that 695.5 g (3.86 equivalents) of Polyepoxide A, 304.5 g (2.67 equivalents) of Polyol D (epoxy:hydroxyl = 1.45:1) and 0.35 g of Catalyst G were employed. The reaction mixture was maintained, with continuous agitation, at 135° C. for 1 hour and 40 minutes.

COMPRATIVE EXAMPLE A

An epoxy resin was prepared by the methods of Example 1, except that 3380 g (18.78 equivalents) of Polyepoxide A, 1120 g (9.82 equivalents) of Polyol D (epoxy:hydroxyl = 1.91:1) and 1.13 g of Catalyst G were employed. The heat generated upon initial mixture of the reactants raised the temperature of the reaction mixture to 138° C. The reaction was stirred and maintained at 130° C. for three hours until there was essentially complete conversion of the polyol component. The chemical and physical properties, including the hydroxyl equivalent weight ("HEW"), of the CCR resins prepared in Examples 1–4 and the epoxy resin prepared in Comparative Example A were measured and the results of said measurements are set forth in Table I.

As evidenced by the data in Table I, the CCR resins of the present invention exhibit substantially lower melt viscosities than a conventional resin having about the same EEW. In addition, the softening point is not substantially reduced.

TABLE I

|  | Example 1 | Example 2 | Example 3 | Example 4 | Comparative Example A |
|---|---|---|---|---|---|
| Reaction Mixture | | | | | |
| Epoxy:Hydroxyl Equivalents | 1.77:1 | 1.69:1 | 1.61.1 | 1.45:1 | 1.91:1 |
| Theoretical EEW | 562 | 606 | 662 | 833 | 503 |
| Reaction Product | | | | | |
| Epoxide, Wt. %[1] | 8.20 | 8.09 | 8.40 | 8.14 | 8.22 |
| EEW | 524 | 532 | 512 | 528 | 523 |
| Residual Phenolic Hydroxyl, Wt. %[2] | 0.293 | 0.458 | 0.752 | 1.18 | 0.04 |
| HEW | 5812 | 3714 | 2260 | 1441 | 42,500 |
| % of Hydroxyl Groups Remaining[3] | 7.44 | 11.3 | 17.9 | 26.0 | 1.0 |
| Melt viscosity at 150° C., cps[4] (Pa.s) | 465 (0.465) | 420 (0.420) | 230 (0.230) | 220 (0.220) | 610 (0.610) |
| Softening Point, °C.[5] | 80.5 | 80.7 | 76.8 | 76.9 | 82.0 |

Footnotes - TABLE I
[1] The weight percent epoxide groups in the CCR resin. This percentage was determined by preparing:
(a) a perchloric acid solution by (1) placing 250 ml of glacial acetic acid into a one liter flask, (2) adding and mixing 13 ml of a 60 percent aqueous solution of perchloric acid into the flask, (3) adding 50 ml of acetic anhydride to the flask, (4) filling the flask to 1 liter with glacial acetic acid and (5) allowing the mixture to age for 8 hours to complete reaction between acetic anhydride and water. The perchloric acid solution is standardized using potassium acid phthalate (0.4 g of potassium acid phthalate in 50 ml of glacial acetic acid) or with the crystalline diglycidyl ether of bisphenol-A;
(b) a tetraethyl ammonium bromide (TEAB) solution by dissolving, at room temperature, with agitation, 100 g of TEAB in 400 ml of glacial acetic acid;
(c) a 0.1 percent solution of crystal violet indicator in glacial acetic acid.
A solution of the CCR resin was prepared using an amount of the CCR resin which contains 0.001 to 0.002 equivalent of epoxy groups by initially weighing the amount of the sample (nearest milligram) into a 2-ounce disposable glass bottle. Thereafter, 10 ml of methylchloride was added to the bottle. A clean magnetic stirrer was used to dissolve the sample of CCR resin and throughout titration. Subsequently, 10 ml of the TEAB solution was added to the CCR resin solution and then 6–8 drops of crystal violet indicator were added. It was then titrated with 0.1 N—perchloric acid to endpoint which is a sharp color change from blue to green and which is stable for 30 seconds.
The percent epoxide groups was then calculated using the formula:

$\% E = \frac{F \times B \times 4.3}{W}$ wherein % E = percent, by weight, of epoxy groups in the CCR resin.
F = normality of perchloric acid solution
B = the volume (in milliliters) of the perchloric acid solution used in the titration to the endpoint
W = weight (in grams) of epoxy resin sample.
[2] The residual phenolic hydroxyl is the weight percent phenolic hydroxyl groups in the CCR resin This percentage was determined by dissolving the CCR resin in a basic medium such as

TABLE I-continued pyridine and titrating to endpoint with a strong base such as tetrabutyl ammonium hydroxide or sodium methylate. In this example, the percent hydroxyl was determined by initially placing 75 ml of pyridine in a 250 ml beaker fitted with a rubber stopper having two holes - one hole for a nitrogen inlet and the other hole for the titration buret - and containing a magnetic stirrer. While agitating, the inside of the beaker was purged with nitrogen for 2 to 3 minutes. An Azoviolet indicator, as a saturated solution in benzene, was then added to the pyridine until the solution became a good straw yellow color. This mixture was titrated with 0.1 N—tetrabutyl ammonium hydroxide to a blue endpoint which normally requires only a few drops. The nitrogen purge was continued for an additional 2 to 3 minutes after this time.
A sample of the CCR resin containing one milliequivalent or less of phenolic hydroxyl groups was dissolved into the pretitrated pyridine. The nitrogen blanket was maintained and the CCR resin allowed to dissolve. The solution was subsequently titrated using a 0.1 N—tetrabutylammonium hydroxide to a blue endpoint. For accurate determination, the tetrabutylammonium hydroxide (TBAH) solution should contain no water.
The weight percent hydroxide groups in the CCR resin were determined using the following formula:

$$D = \frac{1.7 \times N \times (E - F)}{U}$$ wherein D = weight percent phenolic —OH groups in the CCR resin.
N = the normality of TBAH solution
E = the total volume of the TBAH titrant used in ml
F = the volume of the TBAH titrant in ml used in the pre-titration
U = weight of the sample of the CCR resin in grams
[3]The percent of hydroxyl groups remaining is the percentage of hydroxyl groups of the polyol component employed in preparing the CCR resin which remain unreacted, i.e., exist as terminal hydroxyl groups in the CCR resin. The percentage is calculated by the formula:
$\frac{n}{m} \times 100$ wherein n is the number of equivalents of terminal hydroxyl groups in the CCR resin and m is the number of equivalents of hydroxyl groups reactive with an epoxy resin contained by the polyol employed in the preparation of the CCR resin.
[4]Melt viscosity is defined as the viscosity of the molten resin at the specified temperature as measured using an ICI cone and plate viscometer.
[5]Softening point is defined as the temperature at which the epoxy resin suspended in a cup with a 6.35 mm hole in the bottom flows downward a distance of 19 mm as the sample is heated at a linear rate in air. It was measured using ASTM test method designated D-3104-77 using a Mettler softening point apparatus Model FP5/53.

EXAMPLE 5

A CCR resin was prepared using the techniques of Example 1 except that 2097.1 g (11.65 equivalents) of Polyepoxide A, 902.9 g (7.92 equivalents) of Polyol D and 1.05 g of Catalyst G were employed. The reaction mixture containing the catalyst was stirred and maintained at 130? C. for 2.2 hours. At the end of this time, 0.69 g of Reaction Inhibitor L was added to the reaction mixture. The reaction mixture containing the reaction inhibitor was subsequently stirred and maintained at 130° C. for 1.3 hours. At this time, the reaction product was poured from the reactor and allowed to cool and solidify

EXAMPLE 6

A CCR resin was prepared in the same manner as Example 5 except that 719.1 g (4.00 equivalents) of Polyepoxide A, 280.9 g (2.46 equivalents) of Polyol D and 0.35 g of Catalyst G were employed and the reaction mixture was maintained, with constant agitation, at 135° C. for 2 hours. In addition, following the addition of Reaction Inhibitor L to the reaction mixture, the reaction mixture containing the reaction inhibitor was stirred and maintained at 135° C. for 50 minutes. At this time, the reaction product was poured from the reactor and allowed to cool and solidify.

COMPARATIVE EXAMPLE B

An epoxy resin was prepared using the techniques of Example 5 except that 745.6 g (4.1 equivalents) of Polyepoxide A, 254.4 g (2.23 equivalents) of Polyol D and 0.35 g of Catalyst G were employed. The reaction mixture was stirred and maintained at 135° C. for 2½ hours. At this time, 0.23 g of Reaction Inhibitor L was added to the reaction mixture. The reaction mixture containing the reaction inhibitor was stirred and maintained at 135° C. for ½ hour at which time the reaction product was poured from the reactor and allowed to cool and solidify The chemical and physical properties of the CCR resins prepared in Examples 5 and 6 and the epoxy resin prepared in Comparative Example B were measured and the results of these measurements are set forth in Table II.

TABLE II

|  | Example 5 | Example 6 | Comparative Example B |
|---|---|---|---|
| Reaction Mixture |  |  |  |
| Epoxy:Hydroxyl Equivalents | 1.47:1 | 1.62:1 | 1.86:1 |
| Theoretical EEW | 824 | 663 | 535 |
| Reaction Product |  |  |  |
| Epoxide, Wt. %[1] | 7.72 | 8.61 | 8.14 |
| EEW | 557 | 499 | 528 |
| Residual Hydroxyl, Wt. %[2] | 0.942 | 0.808 | 0.103 |
| HEW | 1810 | 2104 | 16,552 |
| Melt viscosity at 150° C., cps (Pa.s)[3] | 300 (0.300) | 240 (0.240) | 590 (0.590) |
| Softening Point, °C.[4] | 77.6 | 73.8 | 82.1 |

[1]Same as Footnote[1] in Table I.
[2]Same as Footnote[2] in Table I.
[3]Same as Footnote[4] in Table I.
[4]Same as Footnote[5] in Table I.

As evidenced by the results in the foregoing Table II, the CCR resins are again shown to exhibit lower melt viscosities than a conventional epoxy resin at similar EEW.

EXAMPLE 7

A CCR resin was prepared using the techniques of Example 5 except that 2054.1 g (11.41 equivalents) of Polyepoxide A and 945.9 g (8.30 equivalents) of Polyol D and 1.05 g of Catalyst G were employed. The reaction mixture containing a catalyst was maintained at 135° C. for 2 hours. At this time, Reaction Inhibitor L (0.69 g) was added. Ten minutes after the addition of Inhibitor L, the mixture was found to have an EEW of 661 and a melt viscosity at 150° C. of 610 cps (0.610 Pa.s). The reaction mixture containing the reaction inhibitor was stirred and maintained at 135° C. for 1 2/3 hours. At this time, the reaction product was poured from the reactor and allowed to cool and solidify. The resulting product was found to have an EEW of 676, an HEW of 1918, and contained 6.36 percent epoxy groups and 0.89 percent terminal hydroxyl groups. This latter figure corresponded to 18.9 percent of the hydroxyl groups of the polyol component employed in preparing the resulting CCR resin. The melt viscosity of the CCR resin at 150° C. was 670 cps (0.670 Pa.s) and the softening point was 87.5° C. As evidenced by these results, the addition of the reaction inhibitor effectively limits further reaction of the epoxide and hydroxyl groups.

It should be noted from this example that the melt viscosity of the thus prepared CCR resin is not significantly higher than the epoxy resin of Comparative Example A, although the EEW is increased significantly.

In a similar manner, a CCR resin was prepared except that the reaction mixture was maintained at 135° C. for 3.25 hours. At this time, Reaction Inhibitor N (0.50 g) was added. Fifteen minutes after the addition of the reaction inhibitor, the mixture was found to have an EEW of 758 and a melt viscosity at 150° C. of 1680 cps (1.680 Pa.s). The reaction mixture containing the reaction inhibitor was maintained, with agitation, at 135° C. for an additional hour. The resulting product was found to have an EEW of 761 and a melt viscosity at 150° C. of 1680 cps (1.680 Pa.s), thereby showing the effectiveness of this reaction inhibitor in terminating the reaction.

Similar results were obtained using Catalyst H to prepare the CCR resin.

EXAMPLES 8-15

A series of CCR resins are prepared from Polyepoxide A, Polyol D and Catalyst G. The polyepoxide and polyol oomponents were used in amounts to give the epoxy:hydroxyl equivalents specified in Table III. The reaction temperature and the reaction inhibitor employed, if any, are set forth in Table III. When no reaction inhibitor was employed, upon obtaining the desired conversion, the reaction was stopped by the techniques of Example I.

COMPARATIVE EXAMPLE C

An epoxy resin was prepared using identical techniques to those of Example 7 except that the polyol component was fully converted.

The chemical and physical properties of the CCR resins of Examples 8-15 and the epoxy resin of Comparative Example C are set forth in Table III.

TABLE III

|  | Example 8 | Example 9 | Example 10 | Example 11 | Example 12 | Example 13 | Example 14 | Example 15 | Comparative Example C |
|---|---|---|---|---|---|---|---|---|---|
| Reaction Mixture | | | | | | | | | |
| Epoxy:Hydroxyl Equivalents | 1.44:1 | 1.37:1 | 1.35:1 | 1.24:1 | 1.11:1 | 1.37:1 | 1.24:1 | 1.24:1 | 1.50:1 |
| Theoretical EEW | 848 | 975 | 1018 | 1406 | 2852 | 975 | 1406 | 1406 | 768 |
| Reaction Temperature, °C. | 130 | 120 | 130 | 135 | 135 | 135 | 135 | 135 | 120 |
| Reaction Inhibitor | none | — | — | — | — | M | L | L | — |
| Reaction Product | | | | | | | | | |
| Weight | 0.8 kg | 0.8 kg | 0.8 kg | 1 kg | 1 kg | 1 kg | 3 kg | 3 kg | 0.8 kg |
| Epoxide, Wt. %[1] | 5.47 | 5.39 | 5.39 | 4.98 | 5.41 | 5.77 | 5.61 | 5.88 | 5.53 |
| EEW | 786 | 798 | 798 | 864 | 796 | 745 | 766 | 731 | 778 |
| Residual Hydroxyl, Wt. %[2] | 0.258 | 0.449 | 0.564 | 0.758 | 1.54 | 0.538 | 1.03 | 1.37 | 0.06 |
| HEW | 6574 | 3791 | 3015 | 2244 | 1104 | 3161 | 1642 | 1238 | 28,333 |
| % of Hydroxyl Equivalents Remaining[3] | 5.66 | 9.5 | 11.8 | 15.0 | 28.4 | 11.4 | 20.5 | 27.2 | 1.36 |
| Melt Viscosity at 150° C., cps[4] (Pa.s) | 2740 (2.740) | 2220 (2.220) | 1900 (1.900) | 1640 (1.640) | 680 (0.680) | 1400 (1.400) | 870 (0.870) | 630 (0.630) | 3600 (3.600) |
| Softening Point °C.[5] | 100.4 | 100.5 | 100.2 | 98.3 | 93.8 | 93.5 | 9.6 | 88.9 | 102.3 |

[1]-[5]Same as Footnote[1] in Table I.

EXAMPLE 16

A CCR resin was prepared by adding to a suitably sized vessel 611.5 g (3.4 equivalents) of Polyepoxide A, 388.5 g (3.41 equivalents) of Polyol D and 0.3 g of a 50 weight percent solution of Catalyst J in water. This reaction mixture was stirred and maintained at 135° C. for 2½ hours. At this time, prior to complete conversion of either the polyglycidyl ether or polyol component, 0.75 g of Reaction Inhibitor L was added to the reaction mixture. The reaction mixture containing the inhibitor was stirred for an additional 2 hours and maintained at 135° C. for this period. At this time, the reaction mixture was poured from the reactor and allowed to cool and solidify.

The resulting product contained 4.61 percent of epoxy groups and 1.91 percent of terminal hydroxyl groups. The HEW of the CCR resin product was 892 and the EEW was 932. The melt viscosity at 150° C. was 700 cps (0.700 Pa.s) and the softening point was 90.3° C. As evidenced by this example, a CCR resin was effectively prepared using equivalent amounts of the polyol and polyepoxide components.

EXAMPLE 17

In an identical manner to that employed in Example 16, a CCR resin was prepared from equivalent amounts of Polyepoxide A (765.4 g) and Polyol E (234.6 g). The reaction mixture containing 0.35 g of the Catalyst G was stirred and maintained at 135° C. for 2.6 hours at which time 0.23 g of Reaction Inhibitor L was added. The reaction mixture containing the inhibitor was stirred and maintained at 135° C. for an additional 3½ hours. The resulting product possessed an EEW of 986 and an HEW 1087. It contained 4.36 percent of epoxy groups and 1.56 percent of terminal hydroxyl groups based on the total weight of the CCR resin. The melt viscosity at 150° C. was 1040 cps (1.040 Pa.s) and the epoxy resin possessed a softening point of 88.5° C.

EXAMPLE 18

A CCR resin was prepared by admixing 629.8 g (3.5 equivalents) of Polyepoxide A, 51.1 g (0.7 equivalents) of adipic acid and 0.35 g of Catalyst G in a suitable sized reaction vessel. The mixture was stirred and maintained at 135° C. for 1⅜ hours. At this time, 319.1 g (2.8 equivalents) of Polyol D and 0.35 g of Catalyst G were added to the reaction mixture. The reaction mixture was stirred and maintained at 135° C. for 1⅜ hours. At this time, 0.46 g of Reaction Inhibitor L was added to the reaotion mixture. The reaction mixture containing the inhibitor was stirred and maintained at 135° C. for 2½ hours. The resulting CCR resin which was prepared using equivalent amounts of the polyepoxide and the polyol components when the carboxylic acid is considered as a polyol, exhibited a melt viscosity at 150° C. of 545 cps (0.545 Pa.s) and a softening point of 83.7° C. The EEW of the resulting resin was 945. The resin contained 4.55 percent epoxy groups and 1.8 percent terminal hydroxyl groups.

EXAMPLE 19

A CCR resin having a high EEW was prepared by reacting 504.4 g (2.80 equivalents) of Polyepoxide A and 295.6 g (2.59 equivalents) of Polyol D in the presence of 0.16 g of Catalyst G for 4 hours at 150° C. At this time, the reaction product was poured from the reactor, cooled rapidly and solidified The EEW was 1795 and the HEW was 2550. The resin contained 2.4 percent epoxy groups and 0.67 percent terminal hydoxyl groups. The CCR resin possessed a melt viscosity at 200° C. of 1620 cps (1.620 Pa.s) and a softening point of 124° C.

COMPARATIVE EXAMPLE D

For purposes of comparison, an epoxy resin having a high EEW was prepared except that 522.6 g (2.90 equivalents) of Polyepoxide A, 277.4 g (2.43 equivalents) of Polyol D and 0.16 g of Catalyst G were reacted at 150° C. for 3½ hours. The polyol component at these conditions was essentially completely converted.

The resulting resin possessed an EEW of 1744 and an HEW of 12947. Although the resin contained 2.47 percent epoxy groups, it contained less than 0.13 weight percent terminal hydroxyl groups Although this is lower than the CCR resin prepared in Example 19, the melt viscosity at 200° C. was 6400 cps (6.400 Pa.s).

EXAMPLE 20

A CCR resin was prepared by reacting 537.6 g (2.99 equivalents) of Polyepoxide A and 462 g (4.06 equivalents) of Polyol D in the presence of 0.35 g of Catalyst G at the conditions of Example 1. The resulting CCR resin had an EEW of 1295 and an HEW of 548. It contained 3.32 percent epoxy groups and 3.10 percent terminal hydroxyl groups. The softeeing point of the resin was 89.4° C. and it had a viscosity at 150° C. of 580 cps (0.580 Pa.s).

A ooating composition was prepared by blending 36.8 parts of the thus prepared CCR resin with 22.5 parts of a phenolic resin sold by Hoechst under the trade name Phenodur® PR 401 (70 percent solution in butanol), 36.7 parts of a mixture of organic liquids comprising 2:1:1 propylene glycol monomethyl ether: butanol:xylene, 0.53 parts of a 25 weight percent solution of phosphoric acid in a glycol ether and 0.53 parts of a silicon flow agent. The resulting composition possessed a viscosity at 25° C. of 270 cps (0.270 Pa.s) and had a total solids content of 52.5 percent.

COMPARATIVE EXAMPLE E

The conventional epoxy resin of Comparative Example D was also formulated into a can ooating composition using the components of Example 20. However, to prepare a coating composition having a viscosity which is suitably employed in commercial operation, the organic liquid solution could contain only 40 percent solids (i.e., hardener plus the epoxy resin) and had a viscosity of 230 cps (0.230 Pa.s) at 25° C.

The coating compositions of Example 20 and Comparative Example E were applied to a tin coated steel substrate, the organic solvent evaporated and the resin cured. The resulting coatings were found to exhibit similar properties. In particular, the coating exhibited similar flexibility as determined by the wedge bend test, similar chemical resistance as determined by boiling the coated substrate in an aqueous acid solution and similar adhesion as measured by cross-hatch testing.

The CCR resins may be converted to powder form for the preparation therefrom of powder coating formulations.

For Examples 21-27 and Comparative Examples F and G, a 6-liter stainless steel pressure reactor was equipped with an agitator, a heating jacket receiving a circulation of oil from an oil thermostat and a nitrogen line for creating an inert nitrogen atmosphere at pressures from 0 to 6 bars. A 1-liter feeding tank was connected with a steel piping to the reactor which could be pressurized with nitrogen for feeding liquids under pressure into the reactor. The following raw materials were employed.

| Components | Description |
|---|---|
| Polyepoxide | Diglycidylether of bisphenol A having an EEW of 180 (liquid epoxy resin) |
| Polyol | Bisphenol A |
| Catalyst | Ethyltriphenyl phosphonium acetate monoacetic acid complex (70 weight percent solution in methanol) |
| Reaction inhibitor | Methylester of paratoluene sulfonic acid |

EXAMPLE 21

2707 g (15.0 equivalents) of polyepoxide and 2802 g (24.6 equivalents) of polyol were added to the reactor. The components were mixed together and heated to 90°

C. to dissolve the polyol in the polyepoxide. Then 2.11 g of catalyst were added to the reaction mixture The reaction mixture was slowly heated up with agitation and under a nitrogen blanket and maintained at 140° C. during approximately 2 hours until the analysis of a sample indicated an epoxy content of 0.41 eq/kg and a phenolic hydroxyl content of 2.0 eq/kg. At that moment 1.94 g of reaction inhibitor was introduced into the reactor and the mixture stirred for one additional ½-hour. The analysis of a sample taken from the reactor indioated that the CCR resin intermediate contained 0.36 eq/kg epoxy end groups and 1.94 eq/kg phenolic hydroxyl groups.

The reactor was then closed and 135.9 g of a phosphoric acid solution in water containing 25.9 g of commercial 85 percent by weight orthophosphoric acid (0.4 percent $H_3PO_4$ on total resin) and 110 g of water (2 percent $H_2O$ based on total resin) were introduced into the reactor from the feeding tank with the help of a nitrogen pressure. The nitrogen over-pressure was increased to 5 bars. The temperature and the pressure were maintained at 130° C. and 5 bars, respectively, for a reaction time of 2 hours.

The pressure was then reduced and the excess water evacuated from the resin under reduced pressure for 30 minutes at 135° C. The resin was then drained from the reactor through a bottom valve and solidified. The properties of the resin derived from the CCR resin are summarized in Table IV.

EXAMPLE 22

A resin derived from a CCR resin was prepared using the techniques of Example 21 except that 1969 g of polyepoxide (10.9 equivalents) and 2038 g of polyol (17.9 equivalents), 1.54 g of catalyst and 1.41 g of reaction inhibitor were employed. The amounts of water and phosphoric acid used to react with the CCR resin were respectively 2.0 weight percent and 0 8 weight percent based on the total resin weight. The properties of this resin are summarized in Table IV below.

EXAMPLE 23

Example 22 repeated except that the amounts of water and phosphoric acid used to react with the CCR resin were respectively 0.7 and 1.0 weight percent based on the total weight of the resin. The results are summarized in Table IV below.

EXAMPLE 24

Example 22 was repeated except that the reaction inhibitor was not used. Instead a phosphoric acid solution in water was directly charged to the reactor. The amounts of water and phosphoric acid used being 1.0 weight percent of each based on total resin weight. The results of the resin analysis and evaluation are summarized in Table IV.

This example demonstrates that phosphoric acid can be used at the same time as reaction inhibitor for the CCR resin and as reactant with the epoxy groups to produce the improved resin of this invention.

EXAMPLE 25

A CCR derived resin was prepared using the technique of Example 21 except that 1969 g of polyepoxide (10.9 equivalents), 2083 g of polyol (17.9 equivalents) and 1.54 g of catalyst were employed. 1.41 g of the reaction inhibitor was added to the reactor at a slightly higher epoxy content so that the CCR resin prepared contained 0.44 eq/kg of epoxy end groups and 2.3 eq/kg of phenolic hydroxyl end groups. This point was reached after stirring and heating the mixture at 143° C. for 1 hour and 55 minutes. The reaction mixture containing the inhibitor was then stirred at 140° C. for 30 minutes 240 g water (6 weight percent based on total resin) was then transferred from the feeding tank into the reactor using a 5 bars nitrogen pressure.

The reaction mixture was then stirred at 140° C. under 5 bars overpressure during 4 hours. The pressure was then slowly released and the excess water evacuated from the reactor under a nitrogen flow first, followed by slightly reduced pressure, the temperature being maintained at 140° C. The resin derived from the CCR resin was then drained from the reactor and allowed to cool and solidify. The analysis of the remaining epoxy groups demonstrated that the residual epoxy groups from the CCR resin were partly hydrolyzed. The final resin contained 0.28 equivalents epoxy and 2.2 equivalents phenolic OH groups per kg resin. The results of the resin analysis and evaluation are summarized in Table IV.

TABLE IV

| Examples | 21 | 22 | 23 | 24 | 25 |
| --- | --- | --- | --- | --- | --- |
| Polyepoxide (g) | 2707 | 1969 | 1969 | 1969 | 1969 |
| Polyol (g) | 2808 | 2038 | 2038 | 2038 | 2038 |
| Catalyst (g) | 2.11 | 1.54 | 1.54 | 1.54 | 1.54 |
| Inhibitor (g) | 1.94 | 1.41 | 1.41 | — | 1.41 |
| CCR Intermediate | | | | | |
| eq. epoxy/kg[1] | 0.36 | 0.36 | 0.36 | 0.38 | 0.44 |
| eq. OH/kg[2] | 1.94 | 2.09 | 2.0 | 2.0 | 2.3 |
| wt. % $H_3PO_4$ | 0.4 | 0.8 | 1.0 | 1.0 | — |
| wt. % water | 2.0 | 2.0 | 0.7 | 1.0 | 6.0 |
| CCR Derived Resin | | | | | |
| eq. epoxy/kg[1] | 0.02 | 0.02 | 0.02 | 0.02 | 0.28 |
| eq. OH/kg[2] | 1.93 | 2.09 | 2.0 | 2.1 | 2.2 |
| eq. epoxy-derived groups/kg[5] | 0.34 | 0.34 | 0.34 | 0.36 | 0.16 |
| 150° C. Melt viscosity[3] (Pa.s) | 2.36 | 2.96 | 3.6 | 2.52 | 9.8 |
| Softening Point[4] (°C.) | 105.8 | 105.5 | 106.5 | 104.0 | 93 |

1. The equivalents epoxide groups per kilogram resin was calculated using the formula:

$$eq/kg = \frac{\text{Percent } E \times 10}{43}$$

2. The equivalents phenolic hydroxyl groups per kilogram resin is derived from the weight percent D using the following formula:

$$eq. \ OH/kg = \frac{D \times 10}{17}$$

3. The equivalents of epoxy-derived groups per kilogram resin was calculated as the difference between the number of equivalents of epoxy groups in the CCR intermediate and the number of epoxy groups found in the final resin product, where there was a reaction that reacted the epoxy groups of a CCR resin.

EXAMPLE 26

2379 g (13.2 equivalents) of polyepoxide and 2121 g (18.6 equivalents) of polyol were charged to the reactor under a nitrogen atmosphere. The components were mixed together and heated to 90° C. to dissolve the polyol in the polyepoxide. Then 1.68 g of catalyst were added to the reaction mixture. The reaction mixture was then heated to 140° C. and maintained at this temperature for 2 hours and 10 minutes. At the end of this time 1.55 g of reaction inhibitor was added to the reaction mixture. The reaction mixture containing the reaction inhibitor was subsequently stirred and maintained at 140° C. for one hour. At this time the reaction product was drained from the reactor and allowed to cool and solidify.

The CCR resin thus prepared contained 0.61 equivalents epoxide groups per kg resin and 1.75 equivalents phenolic groups per kg resin.

EXAMPLE 27

A CCR resin was prepared using the techniques of Example 26 except that 2375 g (13.2 equivalents) of polyepoxide, 2625 g (23.0 eq.) of polyol and 1.85 g of catalyst were employed. The reaction mixture was stirred and maintained at 135° C. for two hours and then at 140° C. for 1¾ hours. At this time, 1.70 g of reaction inhibitor was added to the reaction mixture. The reaction mixture containing the reaction inhibitor was stirred and maintained at 140° C. for one hour. The resin was then drained from the reactor and allowed to cool and solidify. The resin was analyzed and found to contain 0.30 equivalent epoxy groups and 2.15 equivalents phenolic hydroxyl groups per kg resin.

COMPARATIVE EXAMPLE F

A fully converted resin was prepared by admixing in the reactor under nitrogen sparge 2357 g (13.1 equivalents) of polyepoxide and 2642 g (23.2 equivalents) of polyol. The mixture was heated to 90° C. and 2.5 g of catalyst was added to the reaction mixture.

The reactor content was then heated to 150° C. The exothermic reaction caused the temperature to increase to 175° C. The reaction mixture was stirred and maintained at 170° C. for 2 hours. The resin was then drained from the reactor and allowed to cool and solidify. This resin was found to contain 1.94 equivalents phenolic hydroxyl end groups and virtually no epoxy groups (less than 0.02 equivalents per kg).

COMPARATIVE EXAMPLE G

A fully converted resin was prepared using the techniques of Comparative Example F except that 2607 g (14.5 equivalents) of polyepoxide, 1392 g (12.2 equivalents) of polyol and 3.12 g of catalyst were employed. The exotherm peak temperature reached 205° C. for this resin. After analysis, this typical high molecular weight epoxy resin was found to contain 0.58 equivalent epoxy groups (EEW = 1730) and less than 0.05 equivalent phenolic hydroxyl group per kg resin.

Table V summarizes the compositions and analytical results of Examples 26 and 27 and Comparative Examples F and G.

TABLE V

| Examples | 26 | 27 | F | G |
|---|---|---|---|---|
| Polyepoxide (g) | 2379 | 2375 | 2357 | 2607 |
| Polyol (g) | 2121 | 2625 | 2642 | 1392 |
| Catalyst (g) | 1.68 | 1.85 | 2.5 | 3.12 |
| Inhibitor (g) | 1.55 | 1.70 | — | — |
| Eq. Epoxy/kg[1] | 0.61 | 0.30 | 0.02 | 0.58 |
| Eq. Epoxy-derived groups/kg[5] | — | — | — | — |
| Eq. OH/kg[2] | 1.75 | 2.15 | 1.94 | 0.05 |
| 150° C. melt viscosity[3] (Pa.s) | 0.9 | 1.1 | 3.8 | 8.2 at 200° C. |
| Softening point[4] (°C.) | 93.6 | 102 | 107 | 137 |

Footnotes for Table V are the same as for Table IV.

COATING COMPOSITIONS

Coating compositions have been prepared with all resins of Examples 21 to 27 and Comparative Examples F and G following the general description below.

Each coating composition was prepared by blending 36.8 parts of the resins with 22.5 parts of a phenolic resin hardener sold by Hoechst under the tradename Phenodur ® PR 612 (70 percent solution in butanol), a mixture of organic liquids comprising propylene glycol monomethyl ether:propylene glycol monomethylether acetate: xylene in a ratio of 2:1:1, respectively, sufficient to reach a final viscosity at 25° C. of 250 mPa.s (0.250 Pa.s), 0.53 parts of a 25 weight percent solution of phosphoric curing catalyst in glycol ether and 0.53 parts of silicon flow agent. The solids content of each formulation was recorded.

The coating compositions were applied to a tin coated steel substrate, the organic solvent evaporated and the resins cured in an oven at 200° C. for various lengths of time (5, 10 and 20 minutes). The coating properties were evaluated for the speed of cure measured by the number of acetone double rubs resistance and the flexibility measured by the percent wedge bend flexibility. Both of these test methods are comparative tests for coating properties well known in the coating industry: the higher the acetone double rubs (ADR) the better the cure, the higher the percent wedge bend flexibility (0-100 percent) the better the flexibility. These methods are described below.

ACETONE DOUBLE RUBS

A small cotton wool pad is soaked with acetone, applied to the coating and rubbed back and forth over the same area with even pressure until the continuity of the coating is destroyed. The number of "double rubs" necessary for this is noted.

WEDGE BEND

Using a Gardener IG-1125 Bend and Impact Tester, a coated substrate of width 10 cm is bent over a 5 mm mandrel with the lacquered side outwards. This sample is placed between a "hammer" and anvil such that a differential radius of curvature is produced along the length of the sample bend (10 cm), ranging from a very sharp bend (0 mm radius of curvature) to a rounded profile (1.59 mm radius curvature). The length of the continuous coating, starting at end with the rounded profile end and going in the direction toward the sharply bent end, along the bend, in centimeters, divided by 10 (the edge length) gives a percentage indicating the flexibility of the film. In some cases the coating was too brittle and there were discontinuities along the entire length of the bend. This is indicated by the word "brittle".

STORAGE STABILITY

The storage stability of the formulations was measured by the viscosity increase after 8 weeks storage at 40° C. The formulations and the measured coating properties are recorded in Table VI.

TABLE VI

| Formulations | 21 | 22 | 23 | 24 | 25 | 26 | 27 | F | G |
|---|---|---|---|---|---|---|---|---|---|
| Percent solids for 0.250 Pa.s viscosity | 51 | 51 | 51 | 51 | 51 | 54 | 54 | 51 | 42 |
| Viscosity after 8 weeks storage at 40° C., Pa.s | 0.270 | 0.260 | 0.290 | 0.280 | N.D. | 0.390 | 0.360 | 0.2700 | 0.480 |
| 5 Min. Cure/200° C. | | | | | | | | | |
| ADR | 4 | 5 | 10 | 10 | 2 | 1 | 1 | 1 | 1 |
| Percent wedge blend | 75 | 75 | 80 | 80 | brittle | brittle | brittle | brittle | brittle |
| 10 Min. Cure/200° C. | | | | | | | | | |
| ADR | 10 | 20 | 30 | 25 | 5 | 2 | 2 | 1 | 5 |
| Percent wedge blend | 80 | 77 | 75 | 76 | 65 | brittle | brittle | brittle | 80 |
| 20 Min. Cure/200° C. | | | | | | | | | |
| ADR | 60 | 100 | 100 | 100 | 30 | 7 | 7 | 4 | 10 |
| Percent wedge blend | 72 | 70 | 67 | 68 | 65 | 73 | 46 | brittle | 83 |

The data from Table VI demonstrate that the further converted resins of this invention show surprisingly improved combinations of cure speed and storage stability compared to even the CCR resin of Examples 26 and 27. The resin from Comparative Example F, containing only phenolic end groups and no epoxy groups or groups derived from epoxy groups does not develop adequate flexibility at all, even after 20 minutes cure.

The resin of Comparative Example G is an example of an epoxy resin of the type commonly used for interior can coatings. It develops the needed properties after 10 minutes cure as compared to 5 minutes curing time for the resins of this invention. In addition, resin D can be formulated at a maximum solids content of 42 percent as compared to 51 percent solids for the resins of this invention.

Furthermore, it has been found that the resins of Examples 22, 23 and 24 could be formulated into the same coating formulations omitting the 0.53 parts of added curing catalyst solution and develop same properties after same curing times.

On the contrary a four-fold increase of the curing catalyst added to the formulation did not improve the coating properties for Examples 26 and 27 and the Comparative Examples F and G.

What is claimed is:

1. An epoxy resin comprising the reaction product of a polyepoxide and a polyol wherein the reaction product contains both epoxy groups and terminal phenolic hydroxyl groups in an amount of at least about 0.25 weight percent of each of the epoxy groups and the terminal phenolic hydroxyl groups, said weight percent being based on the total weight of the epoxy resin reaction product, and which reaction product exhibits an essentially constant viscosity over time.

2. The epoxy resin as claimed in claim 1, wherein the resin contains from about 0.5 to less than about 20 weight percent epoxy groups and from about 0.25 to less than about 10 weight percent terminal hydroxyl groups.

3. The epoxy resin as claimed in claim 1, wherein the reaction product has a number average molecular weight of less than about 10,000.

4. A process for preparing an epoxy resin which method comprises reacting a polyepoxide with a polyhydric phenol in the presence of a catalyst for the reaction of an epoxy group with a hydroxyl group and terminating the reaction at a point when the reaction product contains at least about 0.25 weight percent of each of the epoxy groups and the terminal hydroxyl groups, said weight percent being based on the total weight of the epoxy resin reaction product 5. The process as claimed in claim 4, wherein the reaction is terminated by the addition of a solvent to the reaction mixture at desired conversion.

6. The process as claimed in claim 4, wherein the reaction is terminated by the addition of a material which effectively inhibits further reaction of the epoxy and hydroxyl groups, the material being added in an amount sufficient to effectively inhibit the 7. The process as claimed in claim 4, wherein the reaction is terminated when from about 10 to about 95 percent of the deficient component or if the polyepoxide and polyhydric phenol components are employed in equivalent amounts, from about 10 to about 95 percent of both components have reacted.

8. The process as claimed in claim 6, wherein the inhibitor is a strong acid or an anhydride or ester of a strong acid.

9. The process as claimed in claim 6, wherein the inhibitor is added in an amount of at least about 1 equivalent per equivalent of catalyst employed 10. A product of the process of claim 4.
11. A product of the process of claim 5.
12. A product of the process of claim 6.
13. A product of the process of claim 7.
14. A product of the process of claim 8.
15. A product of the process of claim 9.

16. An epoxy resin comprising the reaction product of a polyepoxide and a polyol wherein the reaction product contains
   (a) terminal phenolic hydroxyl groups in an amount of at least about 0.15 equivalents per kilogram resin (eq/kg),
   (b) groups derived from epoxy groups, and optionally
   (c) epoxy groups the total amount of groups (b), and, if present (c) in the resin being at least about 0.05 equivalents, per kilogram of resin.

17. An epoxy resin as claimed in claim 16, wherein the total amount of groups (b) and, if present (c) groups in the resin is from about 0.058 to about 2 equivalents per kilogram of resin.

18. An epoxy resin as claimed in claim 17, wherein the resin contains substantially no epoxy groups.

19. An epoxy resin as claimed in claim 16, wherein the resin contains from 1 to 3 terminal phenolic hydroxyl group equivalents per kilogram of resin.

20. A process for preparing an epoxy resin which method comprises reacting a polyepoxide with a polyol in the presence of a catalyst for the reaction of an epoxy group with a hydroxyl group and terminating the reaction at a point when the reaction product contains at least about 0.05 equivalents epoxy groups per kilogram of resin and about 0.15 equivalents terminal phenolic hydroxyl groups per kilogram of resin, then reacting at least a portion of the epoxy groups to form epoxy-derived groups.

21. A process as claimed in claim 20, wherein the epoxy groups are reacted with water.

22. A process as claimed in claim 21, wherein the epoxy groups are reacted with water and acid.

23. A process as claimed in claim 22, wherein the epoxy groups are reacted with water and phosphoric acid.

24. A process as claimed in claim 20, wherein the reaction of the polyepoxde and polyol is terminated and the epoxy groups are reacted with phosphoric acid in a single process step.

* * * * *

UNITED STATES PATENT AND TRADEMARK OFFICE
CERTIFICATE OF CORRECTION

PATENT NO. : 4,722,981

DATED : February 2, 1988

INVENTOR(S) : Raymond A. Koenig and Brian W. Elliott

It is certified that error appears in the above-identified patent and that said Letters Patent is hereby corrected as shown below:

Column 4, line 10, "aromatio" should read --aromatic--.

Column 4, line 26, "-O-S;" should read -- -O-;--.

Column 5, line 52, "0 1:1" should read --0.1:1--.

Column 5, line 55, "2 1," should read --2:1--.

Column 7, line 54, "triohloroacetic" should read --trichloroacetic--.

Column 7, line 61 "acid:" should read --acid;--.

Column 7, line 64, "sulfonio" should read --sulfonic--.

Column 13, line 42, first line under EXAMPLE 2, "CCR resin" should read --A CCR resin--.

Column 13, line 66, "COMPRATIVE" should read --COMPARATIVE--.

Column 15, line 48, "130?C." should read --130°C.--.

Column 17, line 62, "oomponents" should read --components--.

Column 19, line 28, "reaotion" should read --reaction--.

Column 19, line 62, "groups Although" should read --groups. Although--.

UNITED STATES PATENT AND TRADEMARK OFFICE
CERTIFICATE OF CORRECTION

PATENT NO. : 4,722,981

DATED : February 2, 1988

INVENTOR(S) : Raymond A. Koenig and Brian W. Elliott

Page 2 of 2

It is certified that error appears in the above-identified patent and that said Letters Patent is hereby corrected as shown below:

Column 20, line 8, "ooating" should read --coating--.

Column 20, line 22, "ooating" should read --coating--.

Column 21, line 2, "mixture The" should read --mixture. The--.

Column 21, line 11, "indioated" should read --indicated--.

Column 21, line 38, "0 8" should read --0.8--.

Column 23, line 28, "mixture The" should read --mixture. The--.

Column 25, line 45, "51 peroent" should read --51 percent--.

Column 26, line 42, Claim 6, "inhibit the" should read --inhibit the reaction.--.

Signed and Sealed this

Twenty-seventh Day of September, 1988

Attest:

DONALD J. QUIGG

Attesting Officer

Commissioner of Patents and Trademarks